United States Patent Office

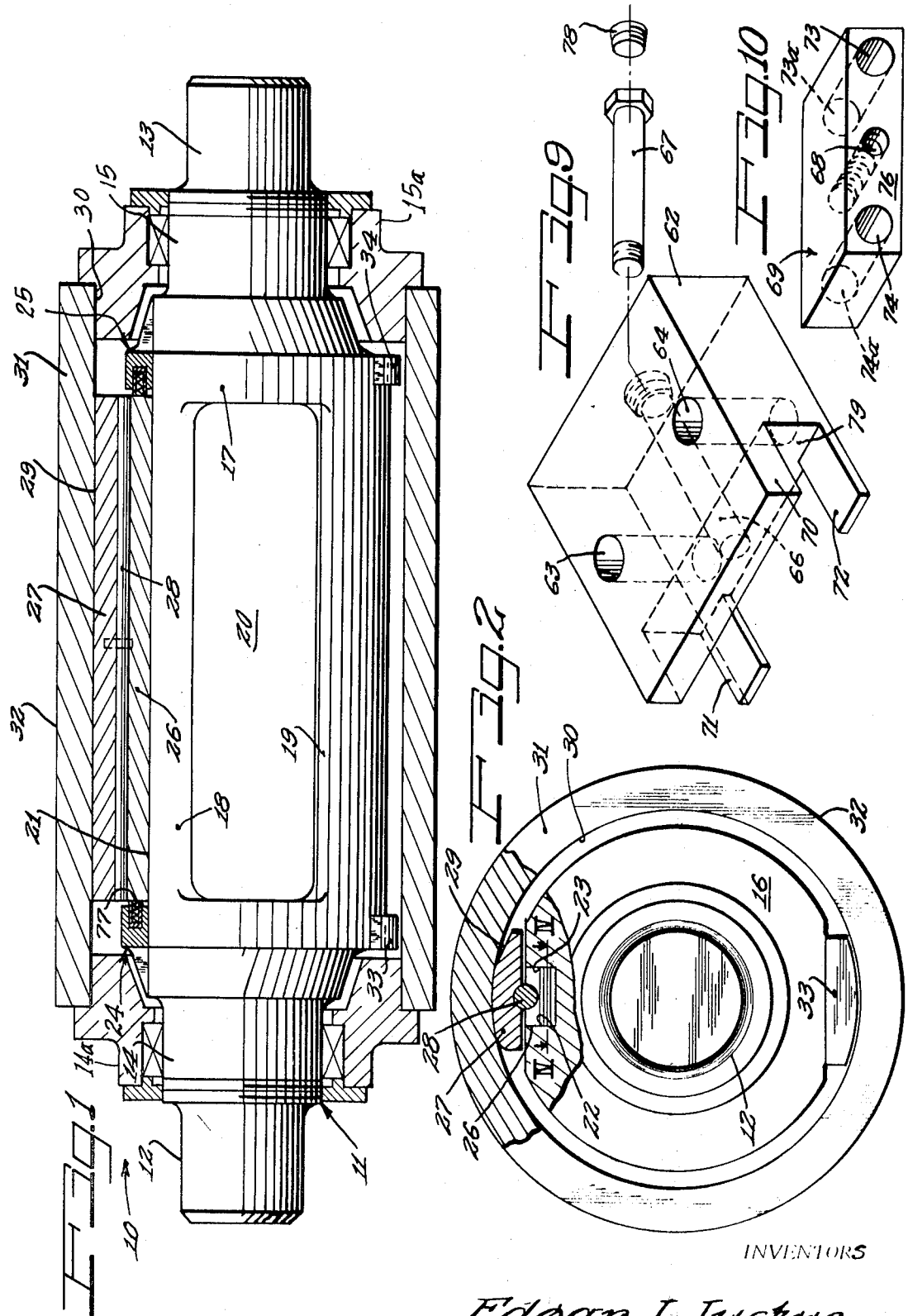

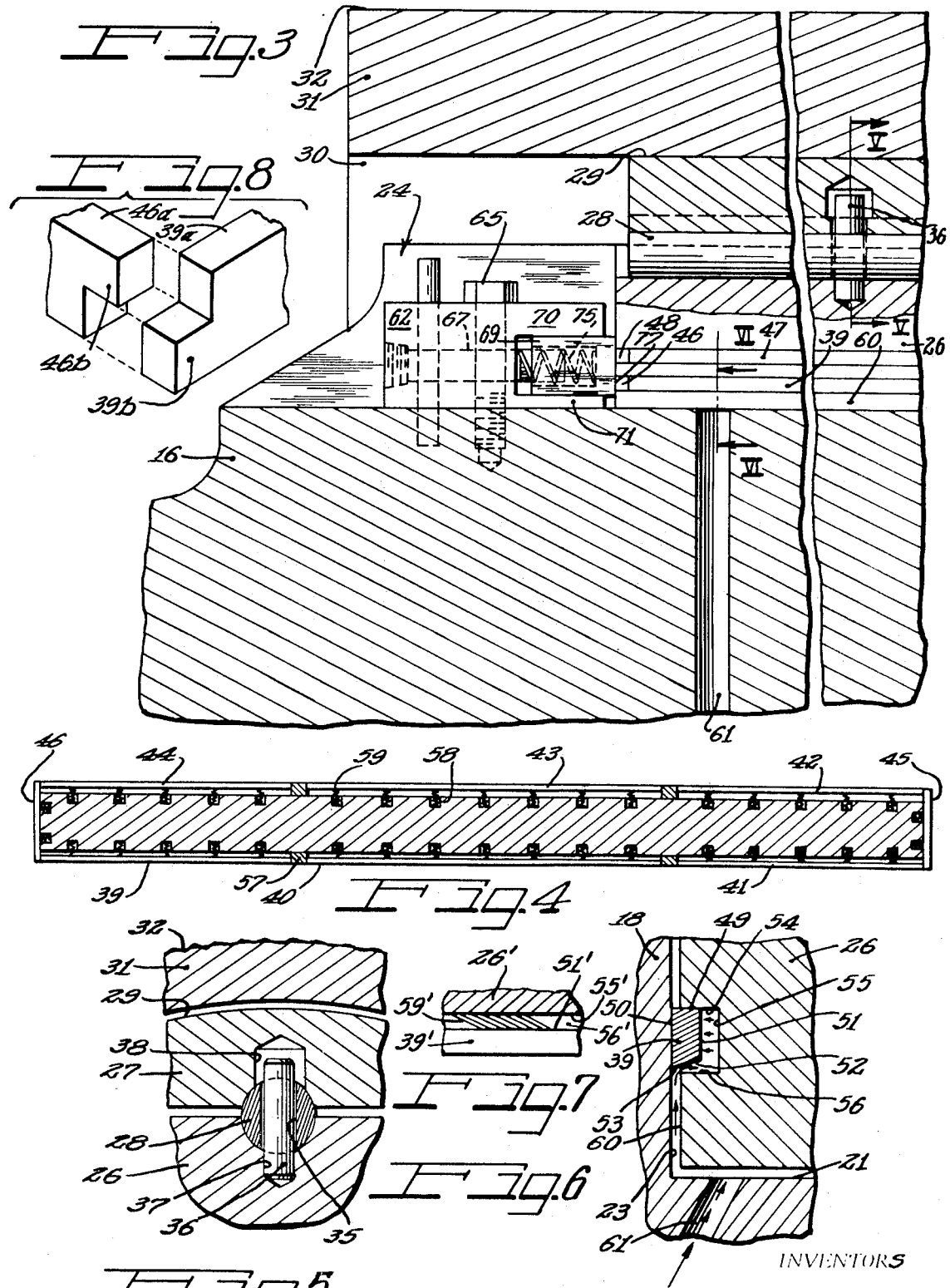

3,624,880
Patented Dec. 7, 1971

3,624,880
PISTON AND END DAM SEALING APPARATUS FOR ADJUSTABLE DEFLECTION ROLLS
Edgar J. Justus, Beloit, Alan R. Sorenson, Orfordville, and John Paul Turcotte, Beloit, Wis., assignors to Beloit Corporation, Beloit, Wis.
Filed June 8, 1970, Ser. No. 44,319
Int. Cl. B21b *13/14*
U.S. Cl. 29—116 R      25 Claims

ABSTRACT OF THE DISCLOSURE

The piston for controlling deflection of a controlled deflection roll is disposed in an elongated slot in the center shaft of the roll and provided with metal sealing strips which are spring biased to be urged against the sidewalls of the elongate slot for initial sealing of the piston. A fluid passageway is provided in communication with shaped surfaces of the sealing strips to force the sealing strips against the adjacent walls of the elongate slot and the seating groove of the piston for the sealing strips. A pair of end dams are provided to define the ends of the elongate slot and to provide the slot with a variable length by means of fluid operated end dams pistons which are also spring biased to provide initial sealing against the end of the piston prior to the application of fluid pressure.

BACKGROUND OF THE INVENTION

Field of the invention

This invention relates to adjustable crown rolls, and more particularly to sealing apparatus for adjustable crown rolls.

Description of the prior art

The advantages of adjustable crown rolls for obtaining a uniform and satisfactory product have been well recognized in the art. United States Patent 3,119,324 and 3,276,102 granted to Edgar J. Justus and assigned to the same assignee as the present invention disclose adjustable crown roll constructions and discusses particular advantages for adjustable crown rolls. In adjustable crown roll constructions, such as disclosed for example in the above Patent 3,276,102, a non-rotatable shaft extends through an outer elongate tubular cylindrical roll shell and the ends of the shaft are rigidly supported on frames or pedestals. A slot is milled in the shaft over the extent thereof which is substantially coextensive with the elongate shell and the slot is provided with end caps or dams for defining the ends of the slot. An elongate pivot bar or piston is disposed in the slot and carries a shaped shoe for sliding engagement with the inner surface of the shell. Fluid under pressure is provided to the elongate slot beneath the pitson. Forces against the roll shell are transmitted to the shoe which forms a slipper bearing or a Kingsbury thrust bearing forming a dynamic wedge of oil against the inner surface of the rotating shell to support the shell. The shoe is substantially coextensive with the length of the shell and is therefore effective to apply radially outwardly directed forces to the shell so that a continuous nip loading force is maintained within the shell.

Thus the force on the roll shell is transmitted through the shoe and piston to the shaft and the oil in the slot provides uniform support. Annular end bearings are located between the ends of the shell and shaft. With load on the roll shell, such as by an opposed roll, the pressure at the nip line can be maintained uniform, and the shaft will obviously deflect downwardly within the shell due to the load transmitted to it.

SUMMARY OF THE INVENTION

The elongate piston for an adjustable crown roll is provided with metal sealing strips in at least one continuous groove about the piston for sealing against the sidewalls of a slot or trench which is formed in the center shaft of a roll and against end dam structures which define the ends of the elongate slot.

The metal sealing strips are disposed in fluid communication with the fluid under pressure which operates the piston so as to be in themselves fluid-operated and urged against the sidewalls of the slot. In addition, the metal sealing strips are provided with a spring bias to effect initial sealing before the application of fluid pressure to the elongate piston.

The slot in the shaft is above the cross sectional center of gravity of the shaft and with vertical load the shaft deflects downwardly and the slot is shortened relative to the piston in the slot. That is, the slot curves downwardly to follow an arcuate shape while the piston remains essentially straight, supported by the fluid in the slot. The piston will tend to bind against the end walls of the slot. The apparatus according to the present invention is therefore provided with an elongate piston slot of variable length by the provision of a pair of end dam constructions which include movable members which define the slot length without binding with the piston. The movable members are in the form of end dam pistons which are also spring loaded to provide initial sealing engagement with the oppositely facing metal sealing strips of the elongate piston, and which are also in fluid communication with the fluid which operates the elongate piston to provide a strong, yet yieldable seal at the ends of the elongate piston.

BRIEF DESCRIPTION OF THE DRAWINGS

Other objects, features and advantages of the invention will become apparent and the invention will be best understood by reference to the following detailed description taken in conjunction with the accompanying drawings, in which:

FIG. 1 is an elevational view, partially in section, showing the general construction of an adjustable crown roll in accordance with the principles of the present invention;

FIG. 2 is an end elevation of the adjustable crown roll of FIG. 1, shown partially broken away;

FIG. 3 is an enlarged detailed elevational view of one end of an adjustable crown roll, shown partially in cross-section;

FIG. 4 is a sectional view taken along the line IV—IV of FIG. 2 specifically showing a series of metal sealing strips about an elongate piston and springs for biasing the metal sealing strips against the sidewalls of the elongate slot;

FIG. 5 is a cross-sectional view taken along the line V—V of FIG. 3 particularly showing the pivotal connection between the elongate piston and the elongate shoe;

FIG. 6 is a fragmentary sectional view taken along the line VI—VI of FIG. 3;

FIG. 7 is a partial fragmentary view of apparatus similar to that of FIG. 4 particularly illustrating a different spring biasing technique;

FIG. 8 is an exploded pictorial view of an alternate end construction for the metal sealing strips;

FIG. 9 is a pictorial exploded view of an end dam piston retaining apparatus; and FIG. 10 is a pictorial representation of an end dam piston for insertion in the apparatus illustrated in FIG. 9.

Various forms and construction details relative to the outer shell and to the center shaft may be employed;

however, such details have been eliminated from the present drawings for the sake of clarity and simplicity. Any suitable construction may be utilized and one skilled in the art will appreciate that features of the constructions disclosed in the aforementioned Pats. 3,119,324 and 3,276,102 may be employed in connection with the apparatus disclosed herein. We therefore wish to incorporate the disclosure of the above-mentioned patents herein by this reference.

DESCRIPTION OF THE PREFERRED EMBODIMENTS

FIGS. 1-6 illustrate a controlled deflection roll or controlled deflection roll assembly 10 which operates in a roll couple to provide a pressure nip between rolls. The roll assembly 10 comprises a center shaft 11 including end portions 12, 13 which are non-rotatably connected to a support structure and which are pivotally supported to permit downward bending of the shaft. The roll assembly is shown shortened for ease of illustration and rolls 30 feet long and longer are used in the paper industry, such rolls will be on the order of 3 to 4 feet in diameter. The shaft 11 further comprises portions 14, 15 for carrying respective annular spherical end bearings 14a and 15a between the shell and shaft for rotationally positioning the ends of the cylindrical shell 31 and permitting bending of the shaft relative to the shell. The shaft may be suitably made, such as by casting with an open portion 20. The opening 20 advantageously reduces the weight and accomplishes a construction of high beam strength for vertical loads and provides a volume within which ancillary equipment, such as lubrication tubing, may be mounted.

The shaft 11 is provided, such as by milling in the top, with an elongate slot which is defined in part by a bottom wall 21 and a pair of sidewalls 22, 23. A pair of end dam constructions 24, 25 are employed to define respective ends of the elongate slot.

An elongate piston 26 is received in the elongate slot between the slot walls 22, 23 and carries pivotally mounted thereon a slipper bearing shoe 27 having a shaped surface 29 for forming a supporting dynamic oil wedge contacting an inner surface 30 of the cylindrical shell 31.

The shoe 27 is supported by the piston 26 being tiltably mounted thereon to act as a Kingsbury thrust bearing by means of an elongate pivot pin 28. FIGS. 3 and 5 illustrate that the elongate pivot pin 28 includes an aperture 35 therein for receiving a pin 36. One end of the pin 36 is tightly received in a bore 37 in the piston 26, while the other end of the pin is loosely received in an enlarged bore 38 in the shoe 27. Although only a single such pin construction is illustrated, a plurality of similar connections could be employed spaced along the elongate pivot pin 28.

The cylindrical shell 31 is disposed about the shaft 11 and includes an outer surface 32 for supporting a traveling web. The shaft 11 further includes a pair of spaced-apart stationary shoes 33, 34 for slidably engaging the inner surface 30 of the shell 31. This prevents the inner surface of the shell from being scored by being rubbed against the shaft such as during assembly.

FIGS. 3, 4 and 5 specifically illustrate the construction and disposition of the sealing apparatus for the elongate piston. The elongate piston is provided with at least one, here two are illustrated, continuous slots or grooves about its girth of greatest dimension to receive a plurality of metal sealing strips 39-48. Each of the grooves receives a plurality of such sealing strips and the lowermost groove is particularly illustrated in cross-section in FIG. 6. The groove defined by sidewalls 54, 55 and 56 receives therein a metal sealing strip 39, preferably of steel, for sealing engagement with the sidewall 54 and the wall of the slot facing the sealing strip, here the wall 23 of the shaft portion 18. For an end sealing strip such as strips 45 and 46, the respective end dams are positioned in the place of the wall 23. The sealing strip 39 includes a surface 49 for sealing engagement with the wall 54 and a surface 50 in sealing engagement with the wall 23. Inasmuch as the wall 54 and the wall 23 are to be placed in sealing engagement with the surfaces 49 and 50, respectively, these surfaces 49 and 50 are provided at the same angular disposition as the walls 54 and 23, preferably 90°.

The sealing strip 39 further includes a rear surface 51 and a lower surface 52 which is disposed at a small angle with respect to a line parallel to the surface 49. This angle is preferably 15°. The sealing strip 39 further includes a short (in cross sectional dimension) surface 53 generally parallel to the surface 49.

The spacing between the sidewall 23 and a sidewall 60 of the piston 26, together with the cross-sectional width of the sealing strip 39 with respect to the width of the groove (length of wall 55) and also the cross sectional height of the sealing strip 39 with respect to the height of the groove forms a fluid passageway so that upon the application of fluid pressure by way of a fluid passageway 61 in the shaft 11 fluid pressure is provided against surfaces 51, 52, and 53 of the sealing strip 39 to urge the strip to the left and upwardly, as viewed in FIG. 6, for sealing engagement with the sidewall 23 of the elongate slot and the upper wall 54 of the groove. The angular disposition of the wall 52 aids in providing the upward component force for sealing.

FIG. 4 illustrates the provision of a plurality of sealing strips 39–46 and that these strips have adjacent thereto a plurality of bores 58 each of which contains a compression spring 59. The compression spring 59 provides initial outwardly directed biasing of the sealing strips to provide sealing prior to and during the initial application of fluid pressure at the passageway 61. These act as expansion compensators when dissimilar metals are used for the sealing strips and the piston. A plurality of sealing members 57 are disposed between adjacent strips in the longitudinal direction; however, it has been determined that adjacent strips, such as strips 39 and 40, may abut each other for satisfactory operation without employing the sealing members 57.

FIG. 7 illustrates the utilization of a flat or wave spring 59' rather than the coil compression spring 59 of FIG. 4. The compression spring 59' is disposed between the elongate piston 26' and a sealing strip 39' so as to bear against wall 55' of the groove and the rear surface 51' of the sealing strip 39'. It is clearly evident that the utilization of such flat springs obviates the necessity of providing a plurality of bores 58 of FIG. 4 for holding the conventional type coil spring.

FIG. 8 illustrates an alternative construction for the ends of the sealing strips where such strips mate at corners of the elongate piston. One of the sealing strips 39a includes a lower protruding portion 39b, the extent of protrusion being equal to the thickness of an end mating strip 46a. The mating strip 46a also includes a protruding portion 46b, also protruding an extent equal to the thickness of the strip 39a to overlappingly and abuttingly mate with the protrusion 39b.

Referring now to FIGS. 3, 9 and 10, an end dam construction for providing a non-binding seal at the end of the elongate piston is illustrated as comprising a block-shaped piston holder 62 having a pair of bores 63, 64 therethrough for receiving respective screws, such as a screw 65, for securing the holder 62 to the shaft portion 16.

The holder 62 includes a bore 66 for slidingly receiving a cap screw 67 therein. The cap screw 67 threadedly engages a threaded bore 68 in an end dam piston 69 and serves to aid in the installation and guiding operation of the piston 69. It is removed after assembling end in center shaft. A plug 78 is threadedly received in the other end of bore 66 to provide fluid sealing thereof. The holder 62 includes a top overhanging portion 70 and a pair of spaced-apart lower extending portions 71, 72 for receiving the end dam piston as the cap screw 67 enters the bore 66. The end dam piston 69 includes a sealing surface 77 for engagement with the corresponding sealing strips, here strips 46 and 48, and is provided with an initial biasing for such sealing engagement by a pair of springs, such as springs 75, which are disposed in respective bores 73, 74 of the end dam piston 69 to bear against the respective surfaces 73a, 74a of the bores 63, 74, and a surface 79 of the holder 62.

The spacing between the portions 71 and 72 of the holder 62 provide a fluid passageway for fluid flow from the passageway 61 upon application of fluid pressure so that fluid pressure is applied against a surface 76, the rear surface, of the end dam piston 69 to urge the piston and its sealing surface 77 into sealing engagement with the sealing strips 46 and 48 of the elongate piston and also acts on the bottom surface of the piston 69 so that the top surface of the piston 69 is in sealing engagement with the bottom surface of the overhanging portion.

Attention is invited that under conditions of heavy loading against the roll which deflects the shaft an amount to substantially shorten the piston slot, the end dam pistons yield as the piston pushes against them and effectively provide a piston slot of variable length as dictated by the particular deflection encountered. The yielding of the end dam pistons prevents adverse binding effects between the end dams and the ends of the piston as was heretofore encountered.

Generally then there has been described and illustrated apparatus for providing fluid-operated seals for the adjustable piston of an adjustable crown roll. More specifically, an elongate piston has been provided with a sealing strip construction including metal sealing strips, preferably steel, which are advantageously shaped to provide fluid flow past and accordingly fluid pressure therebehind upon the application of fluid pressure to the piston to seal the piston against its sidewalls. Further, an elongate piston has been provided with an elongate slot of variable length in accordance with deflection loading encountered in order to prevent binding of the piston at the ends of the elongate slot. In addition, both the metal sealing strips and the end dam pistons are provided with biasing means in order to effect sealing of the piston prior to the application and during the initial application of fluid pressure for operating the piston.

Many changes and modifications of the invention may become readily apparent to those skilled in the art without departing from the true spirit and scope of the invention, and it is to be understood that we wish to include within the patent warranted hereon all such changes and modifications as may be reasonably and properly included within the scope of the appended claims.

What we claim is:

1. An adjustable crown roll comprising:
   (a) a non-rotatable shaft including an axially extending slot in an upper surface having means for supplying fluid under pressure thereto and having slot side walls extending longitudinally of said shaft;
   (b) a tubular shell surrounding said shaft and having a smooth inner surface;
   (c) a pair of end dams disposed at respective ends of said slot for defining slot end walls;
   (d) an elongate piston disposed in said slot and movable therein radially of said shaft;
   (e) a shoe pivotally carried on said piston in supporting relationship with said inner surface of said shell;
   (f) a groove about said piston in its lengthwise direction, said groove having a sealing wall;
   (g) a plurality of serially abutted metal sealing strips disposed in said groove; and
   (h) a fluid passageway extending from said slot to said groove for the application of fluid pressure to force said sealing strips against said sealing wall and the adjacent walls of said slot.

2. An adjustable crown roll according to claim 1, comprising spring means disposed in said groove for urging said metal sealing strips toward their respective adjacent walls independently for the application of fluid pressure.

3. An adjustable crown roll according to claim 1, wherein said piston includes a plurality of bores therein along the bottom surface of said groove, and comprising a plurality of springs individually disposed in said bores to urge said metal sealing strips against the respective walls of said slot.

4. An adjustable crown roll according to claim 1, wherein at least one of said end dams includes a movable member defining the respective end walls, said movable member being yieldably biased to prevent binding of said piston upon deflection of said shaft.

5. An adjustable crown roll according to claim 4, wherein said movable member is an end dam piston, and said dam further comprises a piston holder and means for urging said piston toward said elongate piston.

6. An adjustable crown roll according to claim 5, wherein said end dam further comprises a fluid passageway in communication with said slot for providing fluid pressure to said end dam piston.

7. Sealing apparatus for an adjustable crown roll comprising:
   (a) a shaft including wall means defining a slot in said shaft having means for supplying fluid under pressure to the slot;
   (b) a piston disposed in said slot including means defining a groove about said piston;
   (c) a plurality of seal members disposed in an end-to-end relationship about said piston within said groove; and
   (d) biasing means for urging said members against said wall means.

8. Sealing apparatus according to claim 7, wherein said seal members are metal.

9. Sealing apparatus according to claim 7, wherein said piston has a rectangular cross-section along a plane through the extent of said groove; and the ones of said metal seal members which are disposed at the corners of said piston have complementary shaped and mated ends.

10. Sealing apparatus according to claim 7, wherein said wall means includes at least one end dam; and said end dam comprises an end dam piston for contacting the adjacent seal member, and piston receiving means including means in fluid communication with said slot and operable to face said end dam piston against said adjacent seal member.

11. Sealing apparatus according to claim 7, wherein said groove is of a greater cross section than a seal member and each of said seal members includes at least four surfaces at least two of which are perpendicular for engagement with said wall means and said groove, respectively, to effect sealing between said shaft and said piston.

12. Sealing apparatus according to claim 7, wherein said piston includes a plurality of bores therein spaced apart along the bottom of said groove, and said biasing means includes a plurality of springs individually disposed in said bores.

13. Sealing apparatus according to claim 7, wherein said biasing means includes a plurality of spring means disposed in said groove and bearing against said piston and said metal seal members.

14. Sealing apparatus according to claim 13, wherein each of said spring means includes a flattened coil spring of a plurality of turns, each of which turns contacts both said piston and the adjacent metal seal member.

15. In a roll assembly having a shaft covered by a tubular outer shell disposed about the shaft, means defining a slot in the shaft having a pair of first side walls and a pair of first end walls, a piston disposed in said shaft and carrying a shoe, and a fluid passageway in the shaft construction in communication with the slot for providing fluid pressure to support the piston radially of the shaft, the improvement therewith comprising:
(a) means defining at least one endless groove about said piston having a bottom wall and a pair of spaced-apart second side walls;
(b) a plurality of elongate abutting metal sealing strips disposed in said groove, each of said sealing strips having a lesser dimension between said second side walls than the spacing between the same walls to permit fluid flow between said sealing strips and said bottom wall to force said strips against the adjacent walls of said slot; and
(c) biasing means disposed between each of said strips and said shaft construction for urging said strips against the adjacent walls of said slot.

16. The improvement according to claim 15, wherein at least one wall of said slot and at least one wall of said groove lie perpendicular to one another and each of said sealing strips having a cross-setcion defining first and second surfaces parallel to respective ones of said perpendicular walls, a third surface, and a fourth surface lying between said first and third surfaces at an angle less than 90° with respect to said first surface.

17. The improvement according to claim 16, wherein said fourth surface and said first surface are at an angle of 75°.

18. The improvement according to claim 16, wherein a fifth surface extends between said first and fourth surfaces generally parallel to said second surface.

19. The improvement according to claim 15, comprising at least two bores in the bottom wall of said groove adjacent each of said strips and a plurality of coil springs individually disposed in separate ones of said bores as said biasing means to urge said strip away from the bottom of said groove.

20. The improvement according to claim 15 wherein said biasing means comprises a plurality of springs disposed in said slot between and bearing against said strips and the piston.

21. The improvement according to claim 20, wherein said springs are flattened coil springs each having the coils thereof overlapping and lying at an angle to the length of the spring.

22. The improvement according to claim 15, wherein each of said end walls includes an end dam comprising an end dam piston having the shape of a rectangular parallelepiped and an end dam surface for sealing against the adjacent sealing strip; and a piston holder secured to said shaft construction and including means for receiving said end dam piston therein and means defining a fluid communication path from said slot to said receiving means to urge said end dam piston against said sealing strip upon the application of fluid pressure.

23. The improvement according to claim 22, comprising second biasing means between said piston receiving means and said end dam piston to urge said end dam piston against said sealing strip until fluid pressure is applied.

24. The improvement according to claim 22, wherein said piston holder includes a bore therein, said piston includes a shaft extending therefrom and slidably received in said bore of said piston holder.

25. In an adjustable deflection roll having a rotatable roll shell, a stationary center shaft with an axially extending slot substantially coextensive with the roll shell with means for supplying fluid under pressure to the slot, and elongate piston mounted in the slot to be supported by the fluid, a slipper bearing shoe pivotally mounted on the piston in supporting relationship to the roll shell, and end walls for the slot at the ends of the piston, the improvement comprising:
means yieldably supporting the end walls relative to the shaft so that if the shaft bends downwardly due to fluid pressure in the slot and the piston remains substantially straight, the end walls will not bind the ends of the piston, and thin flexible sealing means between the piston and the slot.

References Cited

UNITED STATES PATENTS

| 3,119,324 | 1/1964 | Justus | 29—116 AD |
| 3,276,102 | 10/1966 | Justus | 29—116 AD |
| 3,416,435 | 12/1968 | Dahl et al. | 29—116 AD X |

FOREIGN PATENTS

| 1,277,792 | 9/1968 | Germany | 29—113 AD |

ALFRED R. GUEST, Primary Examiner